United States Patent Office 3,380,969
Patented Apr. 30, 1968

3,380,969
AROMATIC POLYAMIDES
Harold Wayne Hill, Jr., Bartlesville, Okla., and Stephanie Louise Kwolek and Wilfred Sweeny, Wilmington, Del., assignors to E. I. du Pont de Nemours and Company, Wilmington, Del., a corporation of Delaware
No Drawing. Continuation of application Ser. No. 288,480, June 17, 1963, which is a continuation-in-part of application Ser. No. 774,156, Nov. 17, 1958. This application Oct. 18, 1966, Ser. No. 587,620
4 Claims. (Cl. 260—78)

ABSTRACT OF THE DISCLOSURE

Polymers having as a recurring unit:

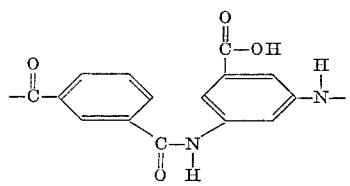

or

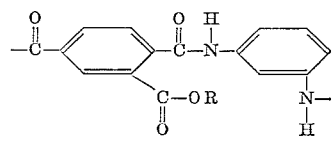

---

This application is a continuation of application Ser. No. 288,480 filed June 17, 1963, now abandoned.

This invention relates to novel polymers and to shaped structures prepared therefrom. More specifically, it relates to high molecular weight aromatic polyamides having unusually high melting points. This application is a continuation in part of our copending application Ser. No. 774,156, filed Nov. 17, 1958, now Patent No. 3,094,511.

Polyamides have found wide commercial acceptance, because they can be formed into strong abrasion-resistant fibers and films. As discussed in the aforementioned application, several desirable properties notably high temperature softening point and resistance to high temperature degradation had not been achieved in polyamides prior to our invention. For example, polyamides disclosed in U.S. 2,130,948 have relatively low melting points, and degrade rapidly in the presence of air at temperatures as low as 200° C. More important, they lose a substantial portion of their strength at temperatures much lower than their melting points. Polyamides disclosed in U.S. 2,244,192 show little tendency to crystallize to a dimensionally-stable structure, soften at temperatures considerably below their melting points and exhibit an undesirable amber color which renders them unsuitable for many purposes. Cold-drawn filaments prepared from these polyamides tend to retract or shrink at temperatures considerably below their melting points due, in part, to lack of crystallinity, and degrade rapidly at their melting temperatures. There had been a need for high molecular weight polyamides which are strong and stable at high temperatures and suitable for forming into filaments and films having water-white clarity. Polymetaphenylene isophthalamide of high molecular weight, disclosed in the aforementioned application along with several of its homologues, provided highly desirably properties, but these products are often so intractable that expensive procedures and materials are required to shape them into fibers and films.

It is an object of this invention to produce a new and useful class of high molecular weight aromatic polyamides formable into films and filaments by economical processes.

Another object is to provide an aromatic polyamide having inherent viscosity of at least 0.6 which has relatively high solubility in commercial solvents.

A still further object is to provide high molecular weight, wholly aromatic polyamides having ester and/or carboxyl substituents on the aromatic ring.

These and other objects will become apparent from the following specification and claims.

In accordance with the present invention there is provided a high molecular weight polymer containing a recurring structural unit from the class consisting of:

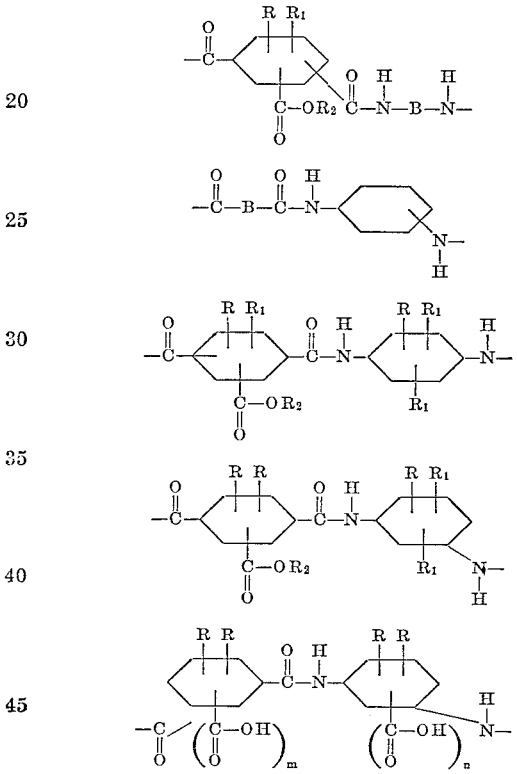

wherein the hexagon represents the benzene nucleus and wherein B is a member from the class consisting of

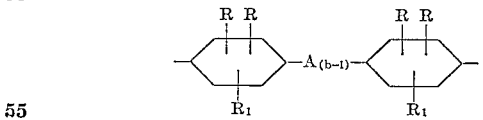

and

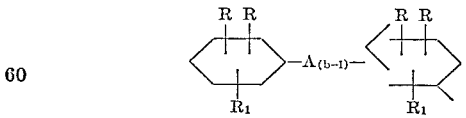

R is a nuclear carbon substituent from the class consisting of —H, —CH$_3$ and —Cl, R$_1$ is a nuclear carbon substituent from the class consisting of —R and —COOR$_2$ and R$_2$ is a member of the class consisting of hydrogen and lower alkyl, A is a divalent radical from the class consisting of —SO$_2$—, —CH$_2$— and

$b$ is a number of from one to two inclusive, $n$ and $m$ are numbers from zero to one inclusive, the sum of which is at least 1 and are attached in positions other than ortho.

High molecular weight polymers of this invention are prepared by interfacial or solvent polymerization by reacting an aromatic diacid chloride with an aromatic diamine, the acid groups of the diacid chloride and the amine groups of the diamine being meta or para oriented relative to each other, at low temperatures (below 100° C.). These processes are described in United States Patent No. 2,831,834 to Magat (Apr. 22, 1958) and United States Patent No. 3,063,966 to Kwolek, Morgan and Sorenson (Nov. 13, 1962).

Polymers of this invention are characterized by an exceptionally high melting point. Whereas known polyamides melt at temperatures below about 270° C., generally the polyamides of this invention have melting points in excess of 300° C. and in many instances above 350° C. Moreover, filaments of polyamides of this invention retain their filament form at temperatures of about 300° C. Polymers of this invention are also distinguished from known polyamides in having water-white color, excellent resistance to corrosive atmospheres and substantially no flammability. These polymers resist melting upon exposure to 300° C. for extending periods while retaining hitherto unrealized high proportion of room temperature physical properties. Flash exposure for 20 seconds to temperatures as high as 700° C. does not destroy these fiber properties. Because of their solubility, these polymers may be processed into shaped structures such as films and filaments by conventional techniques. These polymers have high tenacity, good work recovery, high flex life at elevated temperatures, and are readily crystallizable.

The following examples illustrate the invention. All parts and percentages are by weight unless otherwise indicated. Unless otherwise indicated inherent viscosity reported in the examples is determined in sulfuric acid (sp. gr. 1.841 at 60° F.), at 30° C. at a concentration of 0.5 gram polymer per 100 cc. of solution. All polymers of this invention have an inherent viscosity of at least about 0.6 on this basis and a melting point of at least about 300° C.

EXAMPLE 1

In a 500-ml. 3-necked flask fitted with a stirrer and a nitrogen inlet are placed 15.21 g. of 3,5-diaminobenzoic acid and 200 ml. of dimethylacetamide. The solution is frozen in a Dry Ice bath and 20.3 g. of isophthaloyl chloride is added. The mixture is allowed to warm and is stirred as soon as melting begins. A viscous solution is obtained after 10 minutes. After 45 minutes the polymer is isolated by precipitation in water in a blender. The polymer is washed well with water and methanol and dried at 60° C. under vacuum. The yield is 100% and the inherent viscosity determined at 0.5 g./100 ml. in sulfuric acid at 30° C. is 1.86. A solution containing 27% by weight of the polymer in dimethylacetamide is dry spun.

The fibers formed are drawn 3.5X in steam and have a T/E/Mi of 2.3/54/29 and a fiber stick temperature of 325° C. The drawn fibers withstand 2 minutes at 500° C. without a complete loss of fiber characteristics and lose only 10% in tenacity after 300 hours in a Fade-Ometer. In addition they are readily dyeable with basic dyes and resist accumulation of static charge.

EXAMPLE 2

5-carboxy-m-phenylenediamine (1.522 g.; 0.01 mole) is dissolved in 14 ml. of dimethylacetamide and the solution is cooled to 5° C. Terephthaloyl chloride (2.03 g.; 0.01 mole) is added as a solid with stirring. The mixture becomes viscous within about thirty minutes but is stirred slowly for 24 hr. The product is precipitated in a blender in water and is washed with water and alcohol. The dried product weighs 2.8 g., and has an inherent viscosity of 0.60 and a polymer melt temperature above 400° C.

EXAMPLE 3

A polymer is prepared as in Example 2 above but using 2.375 g. (1.56 ml.) of 5-chloroisophthaloyl chloride in place of the terephthaloyl chloride. The polymer (3.05 g.) has an inherent viscosity of 0.83 and a polymer melt temperature above 370° C.

EXAMPLE 4

A polymer is prepared as in Example 2 above but using 2.592 g. of solid 5-tertiary-butylisophthaloyl chloride in place of terephthaloyl chloride. The product (1.87 g.) has an inherent viscosity of 0.78 and a polymer melt temperature above 400° C.

EXAMPLE 5

2-carboxy-p-phenylenediamine (1.52 g.; 0.01 mole) is dissolved in 15 ml. of pure hexamethylphosphoramide in a 50-ml. Erlenmeyer flask and the solution is cooled with an ice and water bath while being stirred with a magnetic stirrer. There is added in portions 2.03 g. of solid isophthaloyl chloride. Shortly after the time of addition (30 min.) the mixture becomes too viscous to stir with the magnet. It is allowed to stand 3 hr. with occasional manual stirring. The product is isolated by precipitation in water followed by thorough washing. The yield is 95%, the inherent viscosity 1.14, and the polymer melt temperature above 400° C.

EXAMPLE 6

A polymer is prepared by the method of Example 5 but with the 1.66 g. of 4-carboxy-6-methyl-m-phenylenediamine in place of the carboxy-p-phenylenediamine. The solution does not become as viscous as in the previous example but is nevertheless a satisfactory preparation. The yield is 98%, inherent viscosity 0.91 and the polymer melt temperature above 400° C.

EXAMPLE 7

A polyamide is prepared by the procedure of Example 5 from 1.80 g. of 5-carbethoxy-m-phenylenediamine and 2.03 g. of isophthaloyl chloride. The product (3.0 g.) has an inherent viscosity of 0.88 and a polymer melt temperature of about 350° C.

EXAMPLE 8

A polyamide is prepared by the procedure of Example 5 from 1.96 g. of 4,6-dicarboxy-m-phenylenediamine in 30 ml. of hexamethylphosphoramide and 2.03 g. of terephthaloyl chloride. The reaction mixture becomes only moderately viscous. The product (3.1 g.) has an inherent viscosity of 0.6 and a polymer melt temperature above 400° C.

EXAMPLE 9

A polymer is prepared as in the procedure of Example 5 from 1.08 g. of m-phenylenediamine and 2.61 g. of 2-carbomethoxyterephthaloyl chloride. The latter can be prepared by reaction of 4-carboxyphthalic anhydride with methanol followed by treatment of the product with thionyl chloride. The polymer has an inherent viscosity of 0.65. It does not melt up to 350° C. but does undergo a chemical change and become insoluble.

Among the starting materials suitable for preparing polymers of the present invention are included 2-carboxy, 4-carboxy, 4,5-dicarboxy, 4,6-dicarboxy, 3,4-dicarboxy, 2,5-dicarboxy, 2-carboxy-4-methyl, 5-carboxy-4-methyl, 2 - carboxy - 5 - methyl, 4 - carboxy - 6 - methyl, 4 - carboxy - 2 - chloro, 2 - carboxy - 4 - chloro, 2 - carboxy - 5 - chloro, 4-carboxy-5-chloro, 4-carboxy-6-chloro derivatives of phenylene diamine and the 2-carboxy, 2,3-dicarboxy, 2,5-dicarboxy, 2,6-dicarboxy, 2-carboxy-5-methyl, 2-carboxy-3-chloro, 2-carboxy-5-chloro derivatives of p-phenylene diamine, which may be polymerized with isophthalic or terephthalic acid or the derivatives of these acids corresponding to those of the diamines mentioned above. Copolymers of these reactants and those employed in the specific examples can be made in any proportion by mixture of appropriate diamines and/or acids. In addition, up to about 10% polymer-forming ingredients which may or may not contain an aromatic nucleus can be included without seriously detracting from the extraordinary physical and chemical properties of the polymers of this invention. Typical aliphatic copolymerizable starting materials include diamines such as ethylene diamine, tetraethylene diamine, hexamethylene diamine, decamethylene diamine and the like and dibasic acids such as malonic, adipic, and sebacic. Preferably, however, the diamine and diacid compounds utilized will be wholly aromatic, thus resulting in a polymer characterized entirely by structural units with all of the nuclei containing aromatic radicals. Typical aromatic copolymerizable starting materials include diamines such as m-phenylene diamine, p-phenylene diamine, 2,6-dichloro-p-phenylene diamine, bis(4-aminophenyl)methane, 3,3'-dichloro benzidine, p-xylylenediamine and the like and dibasic acids such as isophthalic, terephthalic, bis(4-carboxyphenyl)sulfone, bis(4-carboxyphenyl)ether, bibenzoic acid and the like. In addition alicyclic copolymerizable starting materials such as hexahydro-p-phenylene diamine and hexahydroterephthalic acid as well as heterocyclic materials such as piperazine and the like may be employed. The nature of the linking radical in the chain is not critical in the copolymeric component of the chain and may be other than carbonamide. For instance the linkage of the copolymeric component may be sulfonamide (by substituting a disulfonic acid for a minor proportion of dicarboxylic acid), ester (by substituting a glycol for a minor proportion of diamine), urethane (by substituting a bischloroformate for a minor proportion of dicarboxylic acid) or urea (by substituting phosgene for a minor proportion of dicarboxylic acid).

The polymers of the present invention are particularly useful in the preparation of synthetic fibers characterized by good stability toward heat and light degradation. Furthermore, such fibers are readily dyeable. In addition, these polymers are useful in the preparation of films and in the preparation of adherent coatings for metal priming. Coatings of the polymer have also been noted to be of an antistatic character. For instance, a thin coating of the polymer of Example 1 on a poly(ethyleneterephthalate) structure is observed to reduce the accumulation of static giving a root mean square of time (in seconds) for the decay of an applied potential (averaging a positive charge and a negative charge) as expressed by the relationship $$\tau_{\frac{1}{2}} \frac{d}{RMS}$$

of 5000 seconds at a 10% relative humidity. This compares favorably with cotton which averages 6000 seconds under the same conditions.

Many other modifications will be apparent to those skilled in the art from a reading of the above without a departure from the inventive concept.

What is claimed is:
1. A high molecular weight polymer consisting essentially of a recurring structural unit from the class consisting of

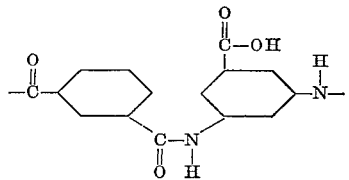

and

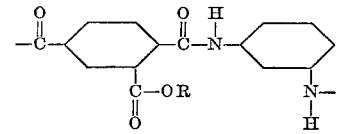

where R is lower alkyl and wherein the hexagon represents the benzene nucleus, the polymer having an inherent viscosity of at least about 0.6 in concentrated sulfuric acid at 30° C. at a concentration of 0.5% by weight.

2. A polymer of claim 1 in which the recurring structural unit is

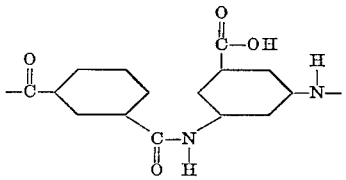

3. A polymer of claim 1 in which the recurring structural unit is

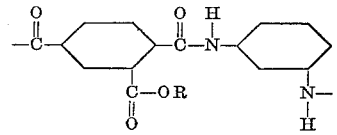

and R is lower alkyl.

4. A polymer of claim 1 in which the recurring structural unit is

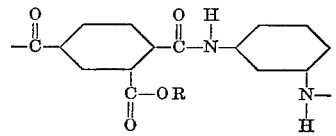

and R is methyl.

References Cited
UNITED STATES PATENTS 3,179,614   4/1965   Edwards _____ 260—78
3,260,691   7/1966   Lavin et al. _____ 260—78

FOREIGN PATENTS 570,858   7/1945   Great Britain.

WILLIAM H. SHORT, *Primary Examiner.*
H. D. ANDERSON, *Assistant Examiner.*